US005483463A

United States Patent [19]
Qin et al.

[11] Patent Number: 5,483,463
[45] Date of Patent: Jan. 9, 1996

[54] UNINTERRUPTIBLE POWER SUPPLY (UPS) AND METHOD

[75] Inventors: Yu Qin; Shanshan Du, both of Troy, Mich.

[73] Assignee: Controlled Power Company, Troy, Mich.

[21] Appl. No.: 100,111

[22] Filed: Jul. 30, 1993

[51] Int. Cl.⁶ .................................................. H02J 9/00
[52] U.S. Cl. .................... 364/492; 395/900; 395/750; 364/493; 307/64; 307/66
[58] Field of Search .................... 395/750, 900; 307/64-66; 364/492, 493

[56] References Cited

U.S. PATENT DOCUMENTS

| | | | |
|---|---|---|---|
| 4,475,047 | 10/1984 | Ebert | 307/66 |
| 5,104,109 | 4/1992 | Kubo | 395/3 |
| 5,176,858 | 1/1993 | Tsukabe et al. | 395/900 |
| 5,327,355 | 7/1994 | Chiba et al. | 395/900 |

OTHER PUBLICATIONS

"An Adaptive AC Monitoring Algorithm for Microprocessor Controlled Parallel Processing UPSs," H. E. Menkes, AT&T Bell Laboratories, Parsippany, N.J., 1987 IEEE Publication CH2477-8/87/000-0512, IEEE INTELEC 1987 Conference Proceedings.

"Fuzzy and Neutral Network Controller," Yasuhiko Dote, 1990 IEEE Paper No. 087942-600-4/90/1100, pp. 1314-1329 published in IECON, 1990, 16th Annual Conference of IEEE Industrial Electronics Society, Nov. 27-30, 1990, vol. II, Publication No. 90CH2841-5.

*Primary Examiner*—William M. Shoop, Jr.
*Assistant Examiner*—Peter Ganjoo
*Attorney, Agent, or Firm*—Barnes, Kisselle, Raisch, Choate, Whitemore & Hulbert

[57] ABSTRACT

A UPS having a ferroresonant transformer is selectively switched from AC line voltage to an inverter by a control method and apparatus using fuzzy logic to select an optimum switching point. The control apparatus and method senses output load current, output voltage and input voltage. Output current is used to calculate output load as a percentage of full load. First membership functions relating to percent load, second membership functions relating to output voltage, third membership functions relating to input voltage switching points, and rules using percent load membership and output voltage membership as antecedents and values of input voltage switching points as consquents as determined by regulation characteristics of the ferroresonant transformer, are used to execute a fuzzy inference and generate dynamic input voltage switching points for comparison with line input voltage to control switching of the UPS between line and inverter sources.

9 Claims, 6 Drawing Sheets

(PRIOR ART)

FIG. 1

(PRIOR ART)

UNINTERRUPTIBLE POWER SUPPLY (UPS) AND METHOD

FIELD OF THE INVENTION

This invention relates to an uninterruptible power supply (UPS) and method using fuzzy inference logic to supply power precisely while minimizing battery usage.

BACKGROUND OF THE INVENTION

AC commercial power is used as a primary power source for computers and other data processing equipment which in turn use stored program and solid state technology. These circuits are generally very sensitive to input power variations from a desired standard waveform. However, commercial AC power waveforms are subject to many variations due to the demands of other users on the power line and other factors. Typical undesirable variations are over-voltage, under-voltage, voltage outages and signal transients. Undesirable variations also occur due to load conditions, as well as line conditions.

A UPS typically includes a battery backup as a secondary or reserve power source which is activated to supply power to the load upon total failure of the commercial power in the case of a blackout or significant degradation of the primary power source, as in a brownout. It is also known to use the regulation characteristics of ferroresonant transformers in UPS systems By way of further background, an exemplary UPS is disclosed in U.S. Pat. No. 4,475,047 (Ebert), granted Oct. 2, 1984.

Figure 1:
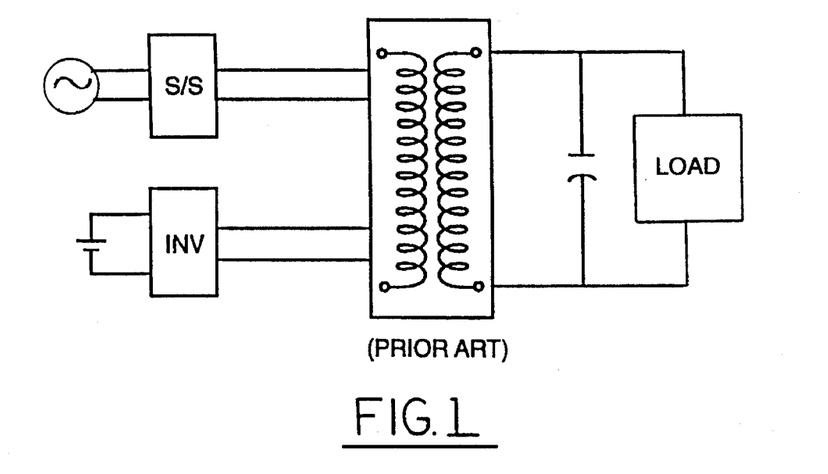
FIG. 1 is a block diagram of a prior art UPS using a ferroresonant transformer.

FIG. 1 also illustrates a prior art uninterruptible power supply using a ferroresonant transformer as a constant voltage regulator. Commercial AC voltage for utility line operation and battery voltage "VB" for battery mode operation are regulated in amplitude by the ferroresonant transformer and the output voltage of the UPS is kept within a few percent, typically plus or minus four percent maximum, from its nominal value.

The battery and inverter "INV" do not deliver power to the output load if the UPS's AC input voltage is within predetermined limits. The inverter logic may be continuously operated in an idling condition, that is, the inverter logic is timed to operate so that the output signal of the inverter will be in phase with the output signal of the power supply. However, during idling, no power flows from the inverter to the output load. Thus the reserve power source is conditioned to respond immediately to supply power to the output load from the inverter upon failure of the primary source. On identifying a failure at the AC input line (the AC input is outside of predetermined upper and lower set points), the line side static switch "S/S" will be opened and the inverter and battery will be brought on the system, continuously supplying the output load.

Because this type of UPS system uses passive line conditioning techniques, the output voltage regulation of the system depends on the characteristics of the ferroresonant transformer and the input voltage range supplied to the ferroresonant transformer. Normally when designing a ferroresonant transformer, the input voltage range (between upper and lower set points) is determined for a full load condition to maintain the output voltage constant within about a four percent tolerance. Under a full load condition, if the input voltage is outside this predetermined range, the UPS should switch to the inverter and battery to prevent the UPS's output voltage from falling outside of its regulation range. However, due to the characteristics of a ferro-resonant transformer, if a load is less than a full load, the output voltage of the UPS could still be within the output regulation range even if the input voltage is outside the predetermined range.

Figure 2:
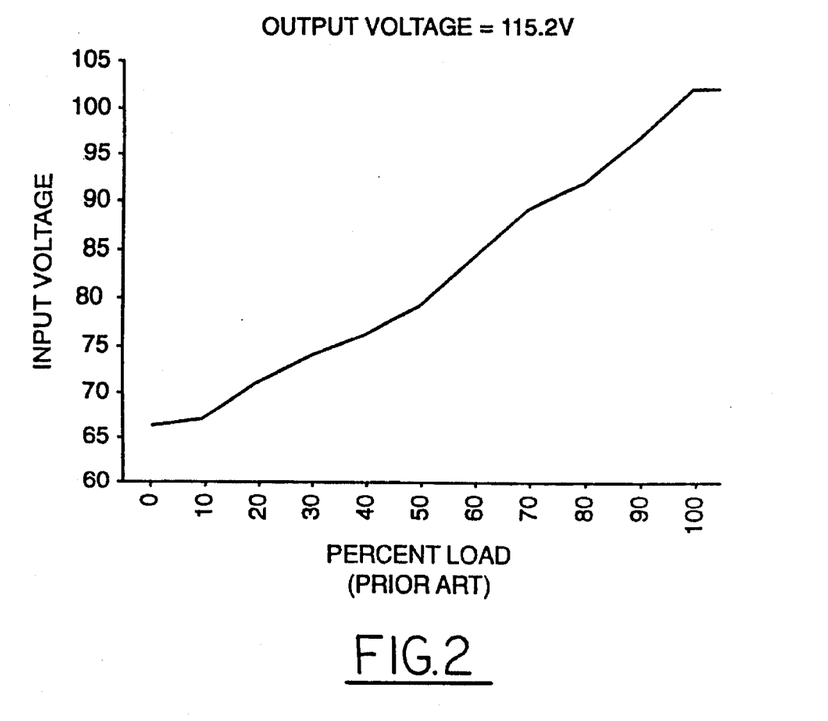
FIG. 2 is a graph showing a typical prior art regulation curve for a UPS having a ferroresonant transformer.

FIG. 2 shows the ferroresonant transformer's regulation characteristics. The output voltage regulation depends on the output load of the UPS and an input voltage range to the UPS. For a full load condition, the output voltage can be maintained within a proper range if the input voltage is above 85% of its nominal voltage, above about 102 volts for 120 volts nominal. If the output load is a half load (50% of a full load), however, the output voltage will still be maintained within a proper range even when input voltage to the transformer is 70% of its nominal voltage, above about 84 volts for 120 volts nominal. Consequently, for different output loads, the input voltage switching point could be different while the output voltage is maintained within the regulation range. If the UPS uses a fixed lower switching point for input voltage, then precious battery power is consumed when a load that is less than a full load could be directly supported, within the regulation range, by the degraded AC input voltage.

The proliferation of computers and other data processing requirements has significantly increased the demand for and sophistication of UPS systems. Microprocessors are used in a UPS to obtain true sine wave inputs at precise phase and frequency, for example, a UPS of the type described in the aforementioned Ebert U.S. Pat. No. 4,475,047. Typically, however, even a sophisticated UPS is controlled as a function of input conditions. This causes switching from the primary power source to the reserve power source regardless of load conditions and thus creates an unnecessary drain on the battery.

It has been suggested in the literature that battery energy can be preserved using a microprocessor and an algorithm to dynamically modify the AC input line switch point according to both UPS output load current and AC input voltage variations. See "An Adaptive AC Monitoring Algorithm For Microprocessor Controlled Parallel Processing UPSs," H. E. Menkes, AT&T Bell Laboratories, Parsippany, N.J., 1987 IEEE publication CH2477-8/87/000-0512, IEEE INTELEC 1987 Conference Proceedings.

As noted by the aforementioned Menkes article, the primary power source is connected to the ferroresonant transformer through a solid-state line switch. The control circuitry must decide when the input switch should be open. In the prior art, this decision is based on the quality of the AC input to the UPS and the UPS's regulation characteristics as described hereinabove. In practice, for example, according to the Menkes article, for a nominal 208-volt AC input voltage, the threshold for operating the UPS input line switch would be approximately 184 volts AC at the low end and 220 volts AC at the high end. The Menkes article concludes that the fixed low end set point dictates that the input line switch would be open upon a slight brownout condition, even though not necessarily required depending upon the load and the regulation characteristics of the UPS. The UPS would treat a slight brownout as a full blackout and unnecessarily consume battery energy. In the case of a brownout, as with a full blackout, battery energy could be fully expended, particularly for small UPSs with short battery reserve times of approximately five minutes. The Menkes article proposed to overcome this problem by monitoring the condition of both the AC input and the load in order to make decisions on the set point at which the input switches would be opened using an adaptive algorithm requiring repeated calculations and decisions. Menkes concluded that it was "impractical and unnecessary" to program the microprocessor to track the regulation characteristics, line and load exactly. Hence the algorithm used a stepwise approximation.

A stepwise approximation could be useful for applications where the load conditions are such that they are not very sensitive to input variations, for example telephone switch gear. However, for loads that are more sensitive to input variations, the stepwise approximation has several disadvantages. Although the Menkes article suggests five stepwise approximations for a nominal 208-volt input UPS, theoretically the number of steps in the approximation could be increased. This would lead to a complex implementation that would not be practical and cost-efficient and could even require a dedicated microprocessor for this limited purpose while requiring further microprocessors to perform the other control functions required by the UPS. With only a limited number of stepwise approximations, the system will not provide optimum conservation of the battery because it would be insensitive to variations within each step and it could be overly responsive to small variations between adjoining steps. With stepwise approximations, even if load conditions would not require a switch to reserve power, the system will still switch to reserve power. Moreover, as noted in the Menkes article, step load increases while in the adaptive mode of operation will not cause immediate switching to the inverter, but rather creates a delayed response until the next time the program loop is executed.

It is desirable, particularly for brownout conditions, not to switch to reserve power unless it is absolutely required by the load conditions. However, the adaptive algorithm technique proposed by the Menkes article is operative only after the UPS has switched to the inverter mode and after verification that the AC input voltage variation is due to a brownout condition and not a blackout condition. For the embodiment described in the Menkes article, whenever the input voltage is less than 184 volts, the UPS first switches to the inverter, regardless of load. Also, the adaptive algorithm is turned off at input voltages above 190 volts pending a decision to enable or disable the adaptive portion of the algorithm. This creates the further possibility of switching to the inverter, regardless of load, if there is a short brownout. Menkes does not consider output voltage in determining input voltage switching points.

By way of further background to the present invention, fuzzy inference controllers are also known for certain applications, for example see "Fuzzy and Neutral Network Controller", Yasuhiko Dote, 1990 IEEE paper No. 087942-600-4/90/1100, pages 1314–1329 published in IECON, 1990, 16th Annual Conference of IEEE Industrial Electronics Society held Nov. 27–30, 1990, Volume II, Publication No. 90CH2841-5. Specific examples of fuzzy inference logic controllers are also described in U.S. Pat. No. 5,176,858 (Tsukabe, et al.), granted Jan. 5, 1993, for a method and apparatus for controlling molding machines and U.S. Pat. No. 5,104,109 (Kubo), granted Apr. 14, 1992, for a paper sheet delivery/stacking control system. However, prior to the present invention, others have failed to apply fuzzy logic to a UPS utilizing the regulation characteristics of a ferroresonant transformer. It might be surmised that this failure occurred because UPS design is conventionally concerned with precise control whereas fuzzy inference control may have been considered too imprecise for that application.

SUMMARY OF THE INVENTION

It is an object of the invention to provide a UPS method and apparatus to dynamically and continuously select an optimum input voltage switching point based on the regulation characteristics of a ferroresonant transformer and at least one output load parameter so that needless switching from utility line operation to battery mode operation is minimized and battery energy is efficiently and effectively preserved.

An apparatus for this purpose according to one embodiment of the present invention comprises a UPS of the type having a ferroresonant transformer and a control circuit comprising means for sensing at least one output parameter which varies as a function of output load, a fuzzy inference apparatus constructed such that at least one membership function relating to output load, a membership function relating to input voltage switching points, and rules using at least load membership as antecedents and values of input voltage switching points as consequents as determined by regulation characteristics of the ferroresonant transformer, are used to execute a fuzzy inference and generate dynamic input voltage switching points for comparison with utility line input voltage to control switching of the UPS between utility line and battery sources as a function of load and line input voltage. In the preferred embodiment, output current is sensed to compute percent output load. Output voltage is also sensed and membership functions and rules for percent load, output voltage and input voltage switching points are used.

According to another embodiment of the present invention, a method of selecting an input voltage switching point for a UPS having a ferroresonant transformer comprises the steps of: sensing at least one output parameter which varies as a function of output load, using at least one membership function relating to output load, a membership function relating to input voltage switching points, and rules using at least load membership as antecedents and values of input voltage switching points as consequents as determined by regulation characteristics of the ferroresonant transformer, to execute a fuzzy inference and generate an input voltage switching point for comparison against utility line input voltage to control switching of the UPS between utility line and battery sources as a function of load and line input voltage. In the preferred embodiment, output current is sensed to compute percent load. Output voltage is also sensed and membership functions and rules for percent load, output voltage and input voltage switching points are used.

Other objects, features and advantages of the present invention will be apparent from the following description taken in conjunction with the accompanying drawings.

DETAILED DESCRIPTION

Figure 3:
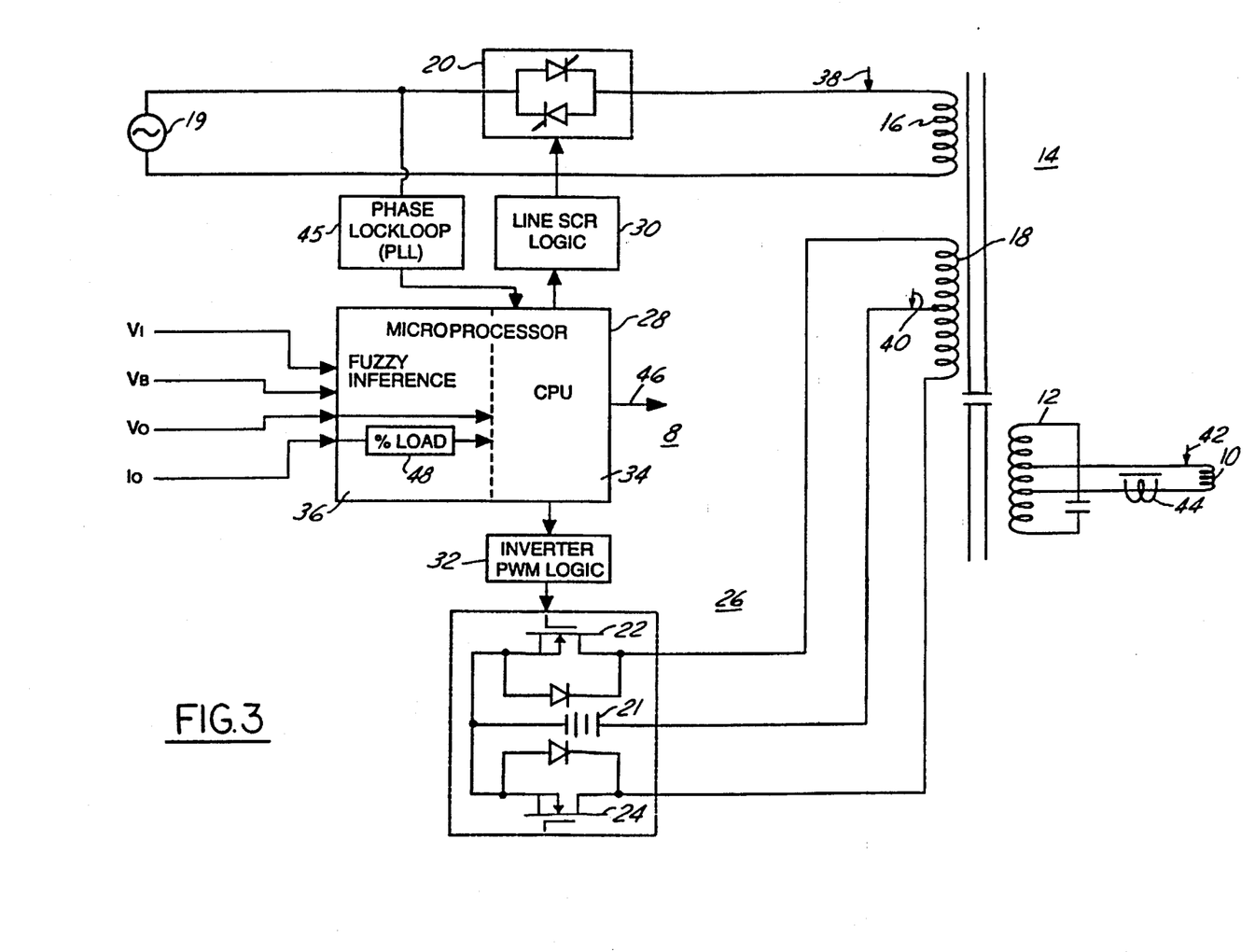
FIG. 3 is a block diagram of a UPS system according to the present invention.

Referring to FIG. 3, a UPS 8 of the present invention is illustrated as supplying a load 10 which is connected to the secondary winding 12 of a ferroresonant transformer 14 having primary windings 16 and 18. Primary winding 16 is supplied with alternating current from a commercial utility line source 19 through a line switch 20 to provide a primary power source. Winding 18 is arranged to be supplied from a battery 21 through Mosfet switches 22, 24 to provide a reserve power source. Battery 21, switches 22, 24 and primary winding 18 constitute conventional inverter 26. Battery 21 is charged from source 19 by conventional means (not shown).

A microprocessor 28 controls line switch 20 and inverter switches 22, 24, respectively, via a line SCR logic circuit 30 and an inverter pulse width modulation logic circuit 32. For purposes of the present invention, microprocessor 28 may be considered as having a central processing unit (CPU) section 34 and a fuzzy inference section 36. For purposes of further illustration, microprocessor 28 receives a phase lock loop (PLL) signal from the input voltage source 19 and phase lock loop circuit 45 which is used by CPU section 34 to phase lock the output of inverter 26 with the input from source 19. Microprocessor 28 also receives four monitoring signals representing the input voltage, $V_i$, from a voltage sensor 38, the battery voltage, $V_B$, from a voltage sensor 40, the output voltage, $V_O$, from a voltage sensor 42 and the output current, $I_O$, from a current sensor 44. The input voltage, $V_i$, battery voltage, $V_B$, output voltage, $V_O$, and output current $I_O$, are also used by CPU section 34 for other conventional system control as indicated at CPU output 46, e.g., system status indicator display, alarm status indicator and RS-232 communications. The fuzzy inference section 36 of microprocessor 28 uses the output voltage, $V_O$, and the output current, $I_O$, to select an optimum input voltage switching point which is supplied to CPU section 34 for comparison against the actual input voltage, $V_I$, to turn inverter 26 on and open line switch 20 when required to maintain the output voltage within a predetermined regulation range.

Figure 4:
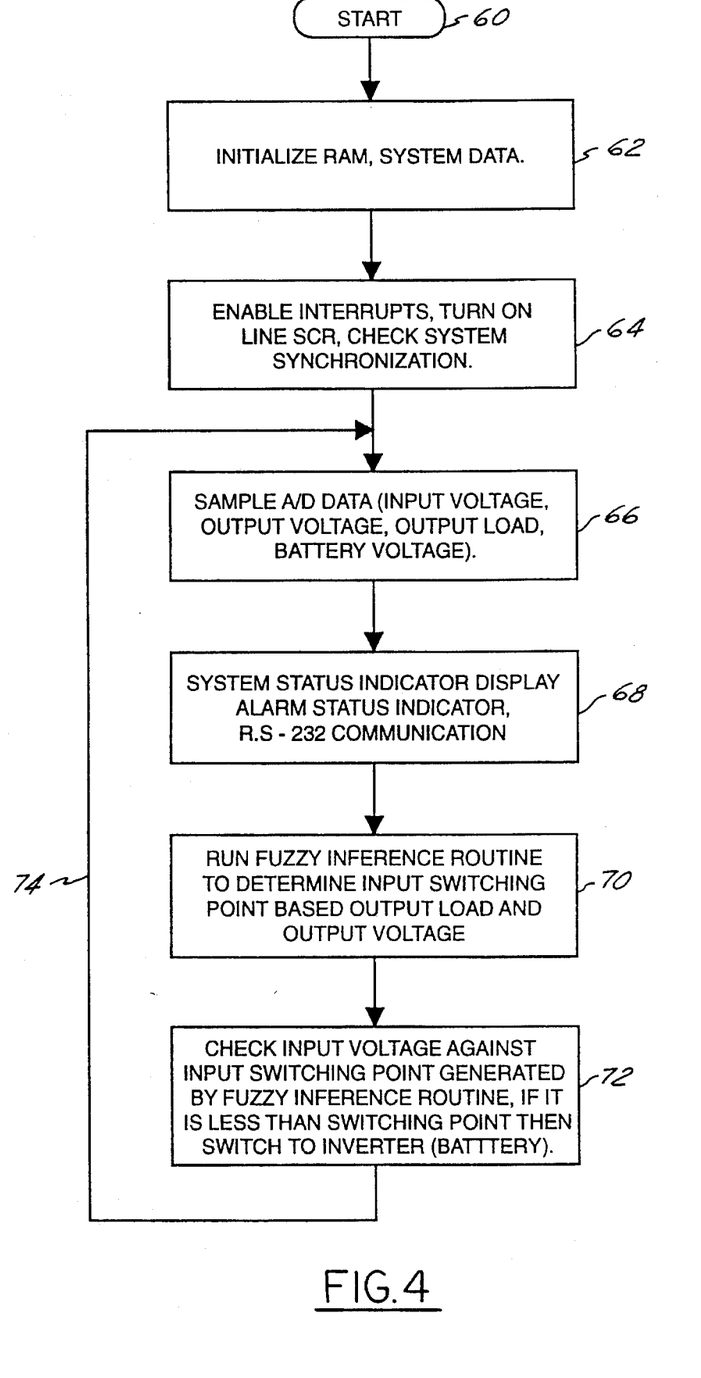
FIG. 4 is a flow chart illustrating the overall operation of the present invention.

Referring to the flow chart of FIG. 4, after a start function 60, function 62 initializes the random access memory (RAM) with system data as with a conventional UPS. In the preferred embodiment, microprocessor 28 is operating in a multitasking environment so that, as indicated at function 64, the next step is to enable the microprocessor interrupts, run multitasking operating system, turn on the line SCR 20, and check the system synchronization in the phase lock loop 45 for the inverter 26. A multitasking operating system allows microprocessor 28 to run the CPU and fuzzy logic programs efficiently and effectively. At function 66, monitoring signals for input voltage, output voltage, output current and battery voltage are then sampled by an analog-to-digital converter (not shown) in microprocessor 28, then the sampled signals are used to display system status, alarm status and establish communication through a conventional RS232 port at function 68.

As will later be explained in greater detail, during function 70 the output current signal is fed to a calculator 48 (FIG. 3) to derive the percentage of the actual output load to full load. Output load percentage and output voltage are then processed in fuzzy inference section 36 utilizing membership functions and fuzzy inference rules which have been preset in the fuzzy inference section 36. By subjecting the output voltage signal and the output load percentage signal to the fuzzy inference rules, fuzzy inference section 36 executes a fuzzy inference and selects an optimum input voltage switching point which is then used by CPU section 34 to selectively switch between battery 21 and source 19, thus controlling the UPS's overall operation. Function 72 is performed in CPU section 34 and checks input voltage against an input voltage switching point selected by function 70 to determine if it is necessary to bring battery power to the system. If the input voltage is less than the input voltage switching point selected, the CPU section 34 will turn line switch 20 off and turn inverter 26 on. Thus output voltage is maintained within its predetermined regulation range. As indicated by loop 74, steps 66, 68, 70 and 72 are repeated continuously to provide continuous system control.

Figure 5:
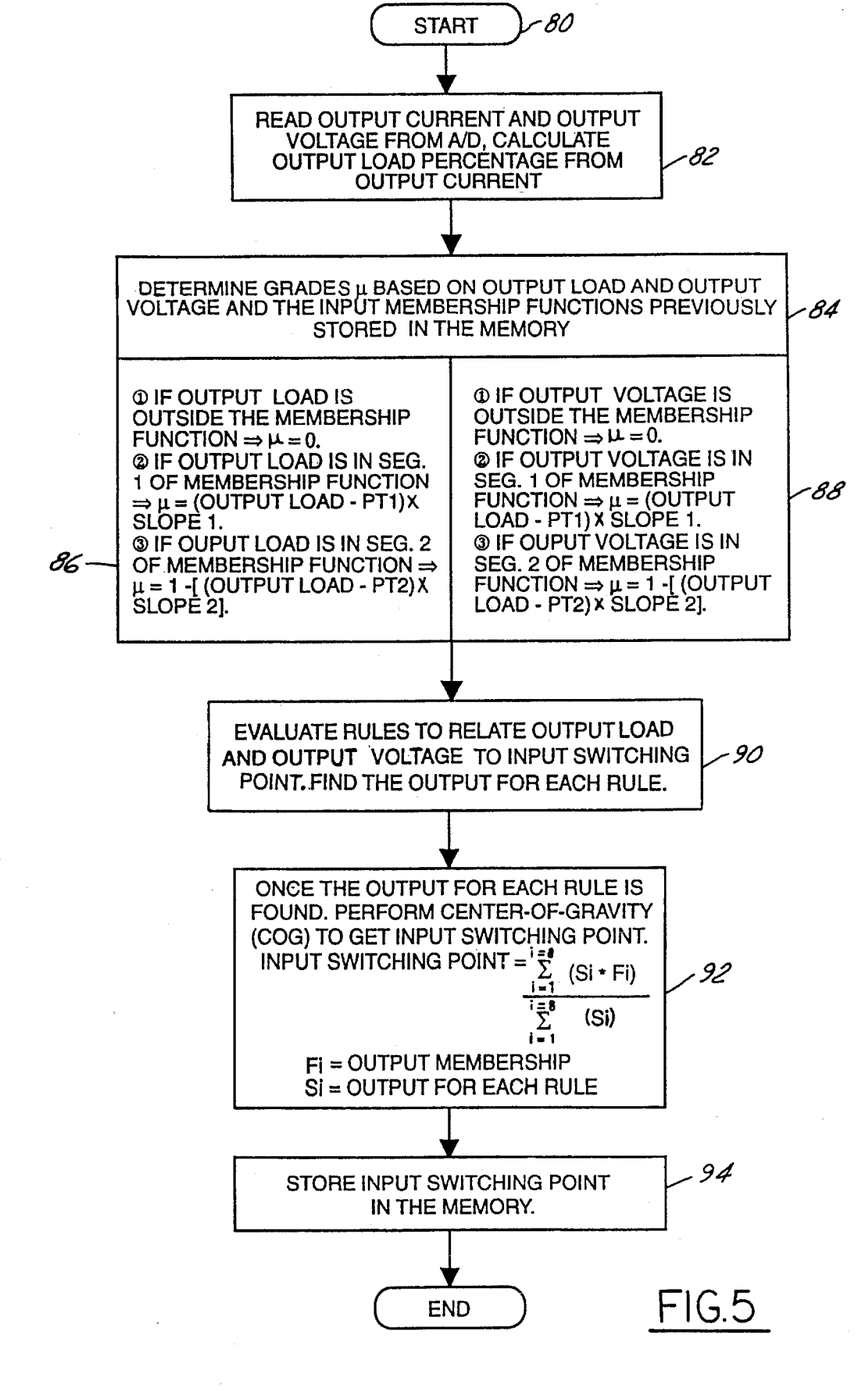
FIG. 5 is a more detailed flow chart for a fuzzy inference function in the flow chart of FIG. 4.

Referring to FIG. 5 for a more detailed description of function 70 of the routine of FIG. 4, upon start function 80 in FIG. 5, as indicated above, during function 82 output current and output voltage are read from the analog to digital converter (not shown) and the output load percentage is calculated from the output current by calculator 48. The load percentage, output voltage and membership functions previously stored in memory are used to determine grades µ, as indicated at function 84, in a manner best understood by reference to FIGS. 6, 7 and 8.

Figure 6:
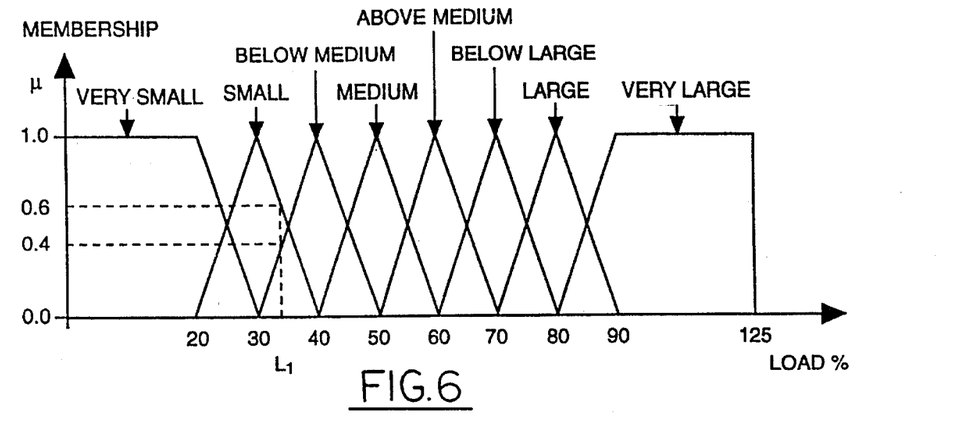
FIG. 6 is a graph showing membership functions for percent output load.
Figure 7:
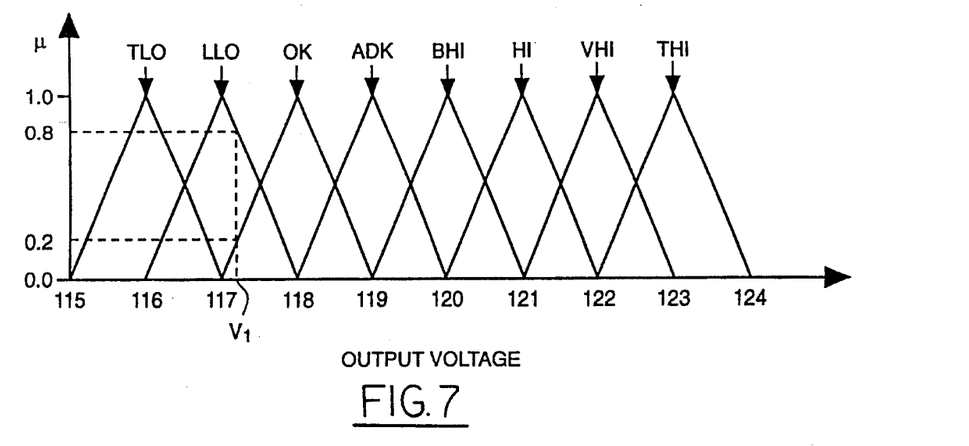
FIG. 7 is a graph showing membership functions for output voltage.

FIG. 6 shows the membership functions for percent output load in one exemplary UPS system of the present invention useful for sensitive electronic loads such as computers and the like. FIG. 7 shows the input membership functions for output voltage for a nominal 120-volt input at source 19. As illustrated in FIG. 6, eight membership functions were selected for percent output load, a very small trapezoidal membership function from 0 to 30 percent load, a small triangular membership function from 20 to 40 percent load, and so on as illustrated with a very large trapezoidal membership function from 80 to 125 percent load. For purposes of applying fuzzy inference rules hereinafter, the membership functions are: "VS" is very small; "S" is small; "BM" is below medium, "M" is medium, "AM" is above medium, "BL" is below large, "L" is large and "VL" is very large. These membership functions were selected based on experience with UPS regulation characteristics using ferroresonant transformers so as to best tailor the functions to the characteristics and are a balance between accuracy and efficiency in applying fuzzy inference rules to a UPS. It will be noted that the triangular membership functions are equidistant spaced functions with equal percent load increments. By way of specific example and as illustrated in dashed lines in FIG. 6, for a load of 34%, grade µ is 0.4 for the below-medium membership function, BM, and 0.6 for the small membership function, S.

Referring to FIG. 7, in the commercial implementation being described, eight membership functions for output voltage were selected from "TLO" (denoting too low) to "THI" (denoting too high), with the remaining membership function labels being "LLO" is a little low, "OK" is acceptable, "AOK" is above OK, "BHI" is below high, "HI" is high, "VHI" is very high and "THI" is too high. Again for one specific example and as shown by the dashed lines in FIG. 7, for an output voltage $V_O$ of about 117.2 volts, grade µ is 0.2 for the OK membership function and 0.8 for the LLO membership function. The eight membership functions of FIG. 7 were selected as all triangular, equidistant and equal output voltage base line increments based on UPS and fuzzy logic design experience.

Figure 8A:
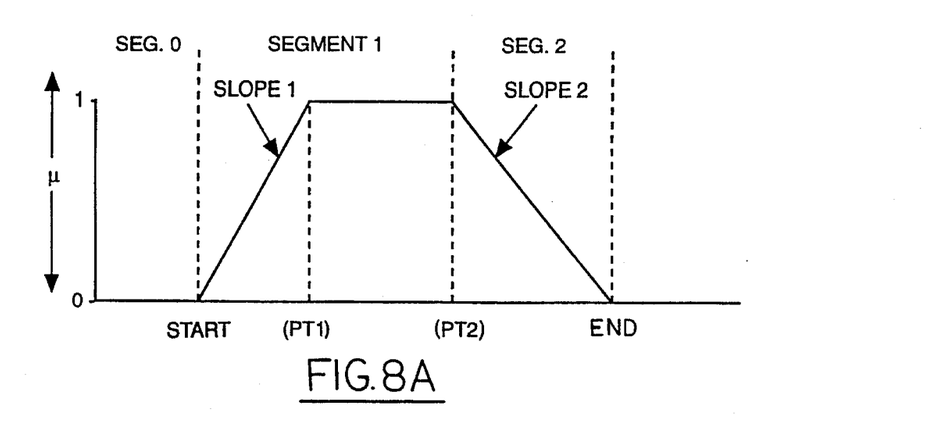
FIGS. 8A and 8B are graphs useful in explaining implementation of the membership functions of FIGS. 6 and 7.
Figure 8B:
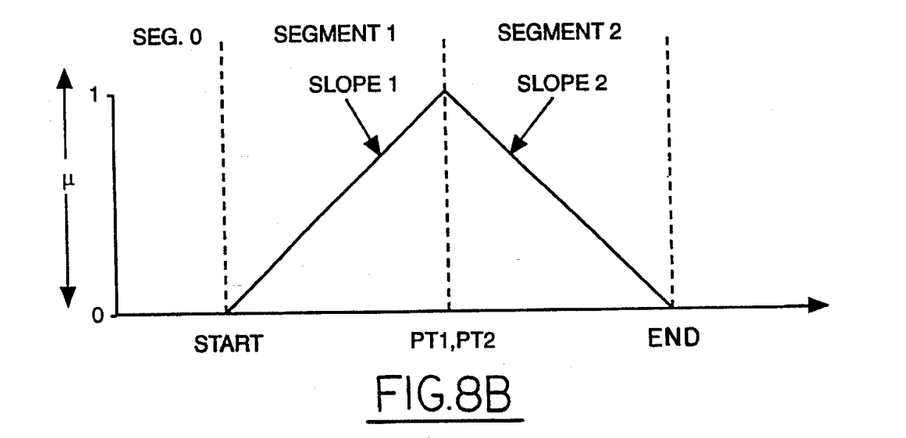

Although the determination of grade μ in function 84 (FIG. 5) is readily apparent graphically from the membership functions shown in FIGS. 6 and 7, in practical implementation these determinations are carried out as separate functions 86, 88 (FIG. 5) in a manner more apparent by reference to FIGS. 8A and 8B. Generally, as depicted in FIG. 8A, a trapezoidal membership function is defined by four points, namely point 1, "PT 1" and point 2, "PT 2", "Start" point and "End" point Slope 1 is then defined by the difference between point 1 and the start point. Slope 2 is likewise then defined by the difference between the end point and point 2. In the more general case of a trapezoid membership function, FIG. 8A, points 1 and 2 are not coincident and define a plateau region therebetween. In the more specific membership function case of a triangle, points 1 and 2 are coincident and there is no plateau region as shown in FIG. 8B. Each trapezoidal membership function is further defined by segment regions, as shown in FIG. 8A by segment "0" which indicates it is outside this membership function, segment "1" which indicates it is part of the non-negative sloped region of the membership function and segment 2 which is part of the negative sloped region of the membership function. In the more specific case of a triangular membership function as shown in FIG. 8B, segment 1 and slope 1 define the same region. For both the general and specific membership function calculations, membership function grade μ is calculated for each of the segments, as follows:

Segment 0: μ=0

Segment 1: μ=(output load percentage–PT1)×Slope 1

Segment 2: μ=1–[(output load–PT2)×Slope 2]

A computer performs the preceding calculation to determine grade μ, for the output load percentage membership functions, as in the example and as graphically apparent from FIG. 6, at 34% of full load for the membership function "S," μ=0.6 and for the membership function "BM," μ=0.4. The same corresponding calculations will determine μ for the output voltage membership functions as in the example and as graphically apparent from FIG. 7 at an output voltage, $V_1$ for the membership function LLO, μ=0.8 and for the membership function OK, μ=0.2. At 0 and 125% load, μ is 1 at the corresponding membership functions.

Figure 9:
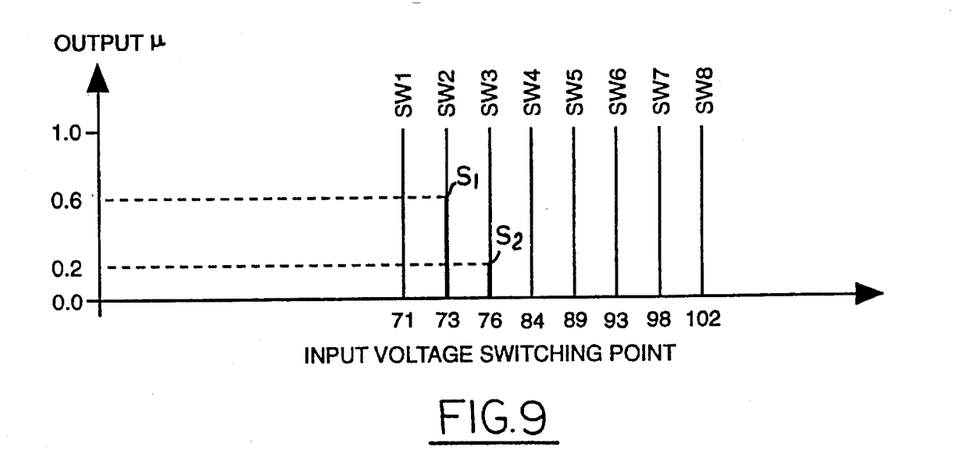
FIG. 9 is a graph showing membership functions for input voltage switching points.

After completing the determination of grade, μ, based on function 84 (FIG. 5), commonly referred to as "fuzzification," the routine proceeds to rule evaluation function 90 (FIG. 5) using the membership functions stored in the microprocessor 28 for input voltage switching points shown in FIG. 9 as singleton membership functions. A singleton membership function is a bar of zero width and was selected for this application to simplify the computations but trapezoidal or triangular functions could also be used. Again, for the purposes of illustration, the membership functions SW1 through SW8 are established based on UPS experience with the regulation characteristic of FIG. 2. For this case it is noted, however, that the membership functions in FIG. 9, unlike the membership functions in FIGS. 6 and 7, were selected to be non equidistant and at unequal intervals on the horizontal axis for input voltage switching. This non-linearity was selected taking into account the non-linearity of the UPS regulation characteristics of FIG. 2 and therefore tailors the membership functions to the UPS regulation characteristics. For example, in FIG. 2 a ten percent increment in load percentage from 50% to 60% corresponds to an input voltage increment of five volts, from 78 volts to 83 volts, whereas a ten percent increment in load percentage from 20% to 30% corresponds to an input voltage increment of two volts, from about 71.5 volts to 73.5 volts.

The following fuzzy inference Rules are then applied to the membership functions according to FIGS. 6 and 7, where "L" are membership functions for load percentage and "V" are the membership functions for output voltage, for correlation to the membership functions for input switching voltage in FIG. 9.

1. If L=VS and V=TLO then Switching Voltage is SW1.
2. If L=S and V=LLO then Switching Voltage is SW2.
3. If L=BM and V=OK then Switching Voltage is SW3.
4. If L=M and V=AOK then Switching Voltage is SW4.
5. If L=AM and V=BHI then Switching Voltage is SW5.
6. If L=BL and V=HI then Switching Voltage is SW6.
7. If L=L and V=VHI then Switching Voltage is SW7.
8. If L=VL and V=THI then Switching Voltage is SW8.

In the foregoing Rules, "if . . ." (for example, "if L=VS and V=TLO" in Rule 1) is typically referred to as the antecedent, and "then . . ." (for example, "then Switch V=SW2" in Rule 2) is referred to as a consequent.

Fuzzy inference in accordance with the MIN–MAX arithmetic Rule as executed by the fuzzy inference section 36 will be further understood by reference to FIGS. 6, 7 and 9. Although fuzzy inference according to the MIN–MAX arithmetic rule was selected for the exemplary application being described, fuzzy inference can be executed in accordance with arithmetic rules other than the MIN–MAX arithmetic rule, for example the average arithmetic rule.

For the sake of simplicity, only the following Rules 2 and 3 (indicated by the example in dashed lines in FIGS. 6, 7 and 9) will be applied for the specific example referred to hereinabove:

Rule 2: If L=S and V=LLO, then Switch V=SW2, and

Rule 3: If L=BM and V=OK, then Switch V=SW3.

For this specific example where the output load percentage, $L_1$, is 34% (FIG. 6), the grade μ to which $L_1$ belongs in the membership function S is 0.6, while the grade μ to which $L_1$ belongs in the membership function BM is 0.4. For the same specific example where the output voltage $V_1$ is 117.2 volts (FIG. 7), the grade μ to which $V_1$ belongs in the membership function LLO is 0.8, while the grade μ to which $V_1$ belongs in the membership function OK is 0.2.

In applying the antecedents to each rule, the MIN operation selects the smaller antecedent for the consequent (membership function for input voltage switching point) of that rule. Consequently, in applying the antecedents to Rule 2 in the specific example being described for the grade μ of 0.6 in output load percentage membership function S and the grade μ of 0.8 in the output voltage membership function LLO, the smaller antecedent (MIN operation), namely, 0.6, is selected, and the membership function of the consequent SW2 will be 0.6, as shown in dashed lines in FIG. 9. As a result, a singleton membership value $S_1$ of 0.6 is obtained for an input voltage switching point of 73 volts.

Similarly, applying the antecedents to Rule 3 according to the grade μ of 0.4 in the output load membership function BM and the grade μ of 0.2 in the output voltage membership function OK, the smaller (MIN operation), namely 0.2, is selected, and the membership function of the consequent SW3 will be 0.2, as shown in FIG. 9. As a result, a singleton membership function $S_2$ of 0.2 is obtained for an input voltage switching point of 76 volts.

Next, each singleton membership function is subjected to a MAX operation to determine the largest grade μ for each membership function. In the specific example being described, the application of Rules 1–8 yielded only one value μ of 0.6 according to Rule 2 for the membership function SW2. In other situations, different values of μ could result from the application of all eight rules, in which event MAX operation would select the largest μ from all of the membership functions. A similar application of a MAX operation to membership function SW3, in the example being described, yields an S2 of 0.2 for the membership function SW3. However, again, application of the eight rules could result in additional values of μ, in which event the MAX operation would select the largest value of μ. This completes the Rule evaluation according to function 90 of FIG. 5.

After the output resulting from the application of each rule is determined, the input voltage switching point is determined by performing a center of gravity (COG method) as indicated by function 92 (FIG. 5) (commonly referred to as "defuzzification") according to the following equation:

$$\frac{\sum_{i=1}^{i=8}(Si*Fi)}{\sum_{i=1}^{i=8}(Si)}$$

where Fi denotes the input voltage switching point memberships and Si denotes the output grades determined by the application of each rule for its respective membership summed over all membership functions, SW1 through SW8. Where Fi are the singleton positions of singleton membership function and Si are the corresponding grades resulting from the MAX operation, the position of the center of gravity derived from the superposed membership functions determines the input voltage switching point.

With the specific example being described where the membership function SW2 is assigned an input voltage switching point of 73 volts and membership function SW3 is assigned an input voltage switching point of 76 volts, the application of a center of gravity method using respective grades μ of 0.6 and 0.2, yields an effective input voltage switching point of 73.75 volts [0.6 (73)+0.2 (76) divided by (0.6+0.2)]. The resulting input voltage switching point is stored in memory for comparison against the input voltage, Vo, by the CPU section 34 as illustrated by functions 72 (FIG. 4) and 94 (FIG. 5). The input data, Vo and Io, is continuously sampled and subjected to the fuzzy inference routine (FIG. 4), with the outputted input voltage switching point continuously being checked against the input voltage, Vo, as indicated by loop 74 in FIG. 4. In general, the input data is sampled at intervals in the millisecond range, depending upon the availability of the fuzzy inference section 36 in the multi-tasking operation of microprocessor 28. Consequently, the UPS is switched to battery 21 and alternator 26 only if the input voltage at the utility line source 19 drops below the switching point as dynamically determined by the fuzzy inference section 36.

From the foregoing description, it will be apparent that the present invention provides a precise selection of an optimum input voltage switching point on an essentially continuous basis, depending on variations in output load, output voltage and input voltage so that line switch 20 is opened and inverter 26 supplies power from battery 21 only when absolutely required by the output load and output voltage. Although in the preferred embodiment selection of the input voltage switching point has been described based on both output load and output voltage, for some applications a fuzzy inference could be used based only on output load. However, a combination of output load and output voltage is preferred to insure that any deviation in the output voltage from the ferroresonant transformer regulation characteristics (FIG. 2) will be taken into account and thus insure precise output voltage control and input voltage switching point determination based on the membership functions programmed into microprocessor 28. Since the membership functions are established based on ideal regulation characteristics, by including output voltage into the determination the fuzzy inference determinations will compensate for variations in actual UPS regulation characteristics, for example deviations caused by manufacturing tolerances for the ferroresonant transformer. As should be apparent, the terms "grade[s]" and "value[s]" have been used interchangeably herein relative to the fuzzy logic. Although specific types and numbers of membership functions have been disclosed herein and were preferred based on UPS and fuzzy logic design experience, other combinations of types and numbers of membership functions could be used within the scope of the present invention.

Although specific embodiments of the present invention have been described hereinabove for purposes of illustration and not limitation, various other modifications and variations are contemplated by the present invention, the scope of which is set forth in the following claims.

We claim:

1. An uninterruptible power supply comprising:

a voltage regulating transformer having predetermined voltage regulation characteristics as a function of load, first input means for coupling a primary AC voltage source to said transformer, an inverter circuit adapted to be energized by a reserve DC voltage source to provide a secondary AC voltage source, second input means for coupling said secondary AC voltage source to said transformer, output means for supplying a regulated output voltage from said regulating transformer to a variable load, first sensing means for developing a first monitoring signal which varies with voltage at said primary source, second sensing means for developing a second monitoring signal which varies with at least one electrical parameter as a function of load variations, input switching means for selectively switching between said first input means and said second input means to supply AC voltage to said transformer, controller means responsive to said second monitoring signal for determining input voltage switching points which vary on a continuous, non-stepwise basis as a function of load variations, and a comparator for comparing said continuously varying, non-stepwise switching points to said first monitoring signal to activate said input switching means, and wherein said controller means comprises means responsive to said second monitoring signal to compute percent load on a dynamic continuous basis and fuzzy inference apparatus means for executing a fuzzy inference operation using at least first membership functions relating to percent load, second membership functions relating to input voltage switching points, and rules using at least load memberships as antecedents and grades of input voltage switching points as consequences as determined by said regulation characteristics of said transformer to generate said switching points on a continuous, non-stepwise basis.

2. The UPS set forth in claim 1 wherein said transformer is a ferroresonant transformer.

3. The UPS set forth in claim 1 wherein said one load parameter is output current.

4. The UPS set forth in claim 3 further comprising third sensing means for developing a third monitoring signal which varies as a function of output voltage at said load and said means for executing a fuzzy inference operation uses third membership functions relating to output voltage as antecedents and rules using percent load membership and output voltage membership as consequents to generate said input voltage switching points.

5. In an uninterruptible power supply of the type having:
a ferroresonant voltage regulating transformer having predetermined voltage regulating characteristics as a function of load,
first input means for coupling a primary AC voltage source to said transformer,
an inverter circuit adapted to be energized by a reserve DC voltage source to provide a secondary AC voltage source,
second input means for coupling said secondary source to said regulating transformer,
output means for supplying a regulated output voltage from said transformer to a variable load,
first sensing means for developing a first monitoring signal which varies with voltage at said primary source,
second sensing means for developing a second monitoring signal which varies with at least one electrical parameter at said load,
input switching means for selectively switching between said first input means and said second input means to supply AC voltage to said regulating transformer, and
controller means responsive to said first and said second monitoring signals to actuate said switching means as a function of both said one load parameter and voltage at said primary source;
the improvement wherein said controller means dynamically generates input voltage switching points on a continuous non-stepwise basis as a function of percent load and comprises
means responsive to said second monitoring signal to compute percent load and
fuzzy interference apparatus means for executing a fuzzy inference operation using membership functions relating to percent load, membership functions relating to input voltage switching points, and rules using at least percent load memberships and grades of input voltage switching points as determined by said regulation characteristics of said transformer to dynamically generate said switching points on a continuous non-stepwise basis for comparison with said primary voltage to control switching of said UPS between said primary and said secondary sources as a function of load and said primary voltage.

6. The improvement set forth in claim 5 further comprising third means for developing a third monitoring signal which varies as a function of output voltage at said load and wherein said means for executing a fuzzy inference operation uses third membership functions relating to output voltage as antecedents and rules using load membership and output voltage membership as consequents to generate said input voltage switching points.

7. A control apparatus for a UPS system of the type having
a ferroresonant transformer which has predetermined voltage regulation characteristics as a function of output load at said transformer,
a primary AC voltage source for supplying said transformer,
a secondary AC source for supplying said transformer and including an inverter circuit adapted to be energized by battery, and
transformer input switching means for selectively switching from said primary source to said secondary source and vice versa,
said control apparatus comprising:
means for sensing output current at said load and calculating output load as a percentage of full load to provide a first input signal which varies as a function of percent load,
means for sensing output voltage at said load and providing a second input signal which varies as a function of output voltage,
fuzzy inference apparatus means responsive to said first and said second input signals for dynamically generating input voltage switching points on a continuous, non-stepwise basis by executing a fuzzy inference operation using first membership functions relating to output load, second membership functions relating to output voltage, third membership functions of values relating to input voltage switching points determined by said regulation characteristics and rules using percent load membership functions selected as a function of said first input signal, output voltage membership functions selected as a function of said second input signal and values of said third membership functions as determined by said selected first and second membership functions to generate said dynamic input voltage switching points on a continuous, non-stepwise basis,
means for sensing voltage at said primary source, and
means for comparing said primary voltage to said dynamic input voltage switching points on a continuous basis to provide a control signal for said input switching means whenever said primary voltage drops below a dynamic input voltage switching point to disconnect said primary source from said regulating transformer and connect said secondary source to said regulating transformer and thereby effectively utilize said battery only when required.

8. The method of operating an uninterruptible power supply of the type having:
a ferroresonant voltage regulating transformer having predetermined regulation characteristics as a function of load,
first input means for coupling a primary AC voltage source to said transformer,
an inverter circuit adapted to be energized by a reserve DC voltage source to provide a secondary AC voltage source,
second input means for coupling said secondary AC voltage to said regulating transformer, and
output means for supplying a regulated voltage from said regulating transformer to a variable load,
said method comprising the steps of:
developing a first monitoring signal which varies with voltage at said primary source,
developing a second monitoring signal which varies with at least one electrical parameter at said load,
using said second signal to compute percent load,
performing a fuzzy inference operation to generate dynamic input voltage switching points on a continuous, non-stepwise basis by using percent load, first membership functions relating to percent load, second membership functions relating to input voltage switching points, and rules using at least load membership as antecedents and values of input voltage switching points as consequences as determined by regulation characteristics of the ferroresonant transformer to generate said dynamic input voltage switching points on a continuous, non-stepwise basis, comparing said dynamic switching points against said first monitoring signal on a continuous basis, and switching said transformer from primary source to said secondary source when said primary source voltage drops below said dynamic switching points so as to efficiently use said reserve source.

9. The method set forth in claim 8 further comprising the steps of:

developing a third monitoring signal which varies as a function of output voltage at said load and performing said fuzzy logic inference using said third monitoring signal, third membership functions relating to output voltage and rules using both percent load membership and output voltage membership as antecedents and values of input voltage switching points as consequents to generate said dynamic switching point.

* * * * *